US012637050B2

(12) United States Patent
Petty et al.

(10) Patent No.: US 12,637,050 B2
(45) Date of Patent: May 26, 2026

(54) ASSISTANCE SYSTEM FOR A VEHICLE, IN PARTICULAR A COMMERCIAL VEHICLE

(71) Applicant: Daimler Truck AG, Leinfelden-Echterdingen (DE)

(72) Inventors: Paul Petty, Portland, OR (US); Lowell Brown, Portland, OR (US); Quyen Duchesneau, Portland, OR (US); Derek Rotz, Portland, OR (US); Cristin Paun, Portland, OR (US)

(73) Assignee: Daimler Truck AG, Leinfelden-Echterdingen (DE)

( * ) Notice: Subject to any disclaimer, the term of this patent is extended or adjusted under 35 U.S.C. 154(b) by 22 days.

(21) Appl. No.: 18/723,839

(22) PCT Filed: Dec. 1, 2022

(86) PCT No.: PCT/EP2022/084002
§ 371 (c)(1),
(2) Date: Jun. 24, 2024

(87) PCT Pub. No.: WO2023/126120
PCT Pub. Date: Jul. 6, 2023

(65) Prior Publication Data
US 2025/0065853 A1     Feb. 27, 2025

(30) Foreign Application Priority Data
Dec. 27, 2021     (GB) ...................................... 2119041

(51) Int. Cl.
B60W 30/09     (2012.01)
B60Q 5/00     (2006.01)
(Continued)

(52) U.S. Cl.
CPC ................. B60T 8/58 (2013.01); B60Q 5/006 (2013.01); B60Q 9/008 (2013.01); B60T 7/22 (2013.01);
(Continued)

(58) Field of Classification Search
CPC ............. B60W 30/09; B60W 30/18159; B60T 8/17558
See application file for complete search history.

(56) References Cited

U.S. PATENT DOCUMENTS

| 7,515,056 B2 * | 4/2009 | Knoop | .................. | B60R 21/013 |
| | | | | 180/277 |
| 12,012,095 B2 * | 6/2024 | Lim | ..................... | B62D 15/021 |

(Continued)

FOREIGN PATENT DOCUMENTS

| CN | 106023652 A | 10/2016 |
| EP | 2642464 A1 | 9/2013 |
| EP | 3576073 A2 | 12/2019 |

OTHER PUBLICATIONS

International Preliminary Report on Patentability received for PCT Patent Application No. PCT/EP2022/084002, mailed on Jul. 11, 2024, 7 pages.

*Primary Examiner* — Long T Tran
(74) *Attorney, Agent, or Firm* — ArentFox Schiff LLP

(57)     ABSTRACT

The invention relates to an assistance system (16) configured to be installed in an ego vehicle (10) and support a driver of the ego vehicle (10) in avoiding a collision of the ego vehicle (10) with another vehicle (18), the assistance system (16) being configured to monitor an environment (40) of the ego vehicle (10) and detect the other vehicle (18) approaching the ego vehicle (10). The assistance system (16) is configured to determine that the driver of the ego vehicle (10) is about to perform a turning maneuver (32) of the ego vehicle (10) towards a driver's side (26) of the ego vehicle (10). The
(Continued)

assistance system (16) is configured to determine the risk of a collision resulting from the turning maneuver (32), between the ego vehicle (10) and the other vehicle (18).

21 Claims, 5 Drawing Sheets

(51) Int. Cl.
    *B60Q 9/00*           (2006.01)
    *B60T 7/22*            (2006.01)
    *B60T 8/171*          (2006.01)
    *B60T 8/172*          (2006.01)
    *B60T 8/58*            (2006.01)

(52) U.S. Cl.
    CPC .............. *B60T 8/171* (2013.01); *B60T 8/172*
          (2013.01); *B60T 2201/022* (2013.01); *B60T*
      *2201/024* (2013.01); *B60T 2220/00* (2013.01);
        *B60T 2250/03* (2013.01); *B60T 2250/04*
                    (2013.01)

(56)           References Cited

U.S. PATENT DOCUMENTS

| | | | |
|---|---|---|---|
| 2005/0012602 A1* | 1/2005 | Knoop | B60R 21/013 |
| | | | 701/45 |
| 2013/0253815 A1 | 9/2013 | Orfila et al. | |
| 2017/0113665 A1* | 4/2017 | Mudalige | G08G 1/163 |
| 2017/0113683 A1* | 4/2017 | Mudalige | B60W 30/0956 |
| 2021/0053561 A1* | 2/2021 | Beller | G08G 1/166 |
| 2021/0055733 A1* | 2/2021 | Beller | G05D 1/0088 |
| 2021/0229702 A1* | 7/2021 | Tsuji | B60W 60/0016 |
| 2021/0261122 A1* | 8/2021 | Packer | B60W 30/0953 |

* cited by examiner

ASSISTANCE SYSTEM FOR A VEHICLE, IN PARTICULAR A COMMERCIAL VEHICLE

This non-provisional patent application is a 371 national stage of co-pending PCT application no. PCT/EP2022/ 084002, filed on Dec. 1, 2022, and titled "ASSISTANCE SYSTEM FOR A VEHICLE, IN PARTICULAR A COMMERCIAL VEHICLE," which claims priority to GB patent application no. 2119041.8, filed on Dec. 27, 2021. Both of these applications are incorporated herein by reference in the entirety.

FIELD OF THE INVENTION

The invention relates to an assistance system for a vehicle, in particular a commercial vehicle.

BACKGROUND INFORMATION

DE 10 2018 200 856 A1, DE 10 2017 218 790 A1 and DE 10 2017 210 377 A1 show vehicle travel assistance devices, wherein the respective vehicle travel assistance device is configured to be installed in an ego vehicle and support a driver of the ego vehicle in avoiding a collision with another vehicle.

SUMMARY OF THE INVENTION

It is an object of the present invention to provide an assistance system for a vehicle such that a driver of the vehicle may be supported in avoiding a collision in a particularly advantageous way.

This object is solved by an assistance system having the features of patent claim 1. Advantageous embodiments with expedient developments of the invention are indicated in the other patent claims.

The invention relates to an assistance system configured to be installed in an ego vehicle which, preferably, may be configured as a commercial vehicle. For example, the ego vehicle may be configured as a tractor-trailer combination comprising a tractor which is articulatedly connected with a trailer. The assistance system according to the present invention is configured to support a driver of said ego vehicle in avoiding a collision of the ego vehicle with another vehicle which, for example, approaches the ego vehicle in a longitudinal direction of the ego vehicle. The assistance system according to the present invention is configured to monitor an environment of the ego vehicle and detect the other vehicle approaching the ego vehicle, in particular in said longitudinal direction of the ego vehicle and, preferably, in a longitudinal direction of the other vehicle. For example, the longitudinal directions of the ego vehicle and the other vehicle are parallel to each other. The assistance system according to the present invention is further configured to determine that the driver of the ego vehicle is about to perform a turning maneuver of the ego vehicle towards a driver's side of the ego vehicle. Said turning maneuver of the ego vehicle towards the driver's side of the ego vehicle is also referred to as a driver side turn, driver side turning maneuver, driver's side turn or driver's side turning maneuver. Said turning maneuver of the ego vehicle towards the driver's side of the ego vehicle is understood to be such a turning maneuver in which the driver of the ego vehicle steers the ego vehicle towards a side which is arranged on the driver's side of the ego vehicle. Thus, for example, if the driver's side of the ego vehicle is a left side of the ego vehicle with respect to a forward direction of travel of the ego vehicle, said driver side turn is a left turn. If, for example, the driver's side of the ego vehicle is a right side of the ego vehicle with the forward direction of travel of the ego vehicle, said driver side turn is a right turn of the ego vehicle. In this regard, the ego vehicle travels in said forward direction of travel when the vehicle travels or is driven forwards, in particular along the longitudinal direction of the ego vehicle. Thus, for example, firstly, the ego vehicle is driven along its longitudinal direction and in the forward direction of travel. Secondly, for example, the driver is about to perform said turning maneuver towards the driver's side of the ego vehicle. In this regard, for example, the other vehicle approaches the ego vehicle in such a way that the other vehicle travels along its longitudinal direction and in its forward direction of travel along a lane which, for example, might be crossed by the ego vehicle when performing said turning maneuver. Since the other vehicle travelling along said lane, along the lane, which, for example, might be crossed by the ego vehicle when performing said turning maneuver. Since, the other vehicle travelling along said lane, along the longitudinal direction of the other vehicle and in the forward direction of travel of the other vehicle, and since the ego vehicle performs said turning maneuver such that the ego vehicle might cross said lane, there might be a potential risk of the ego vehicle colliding with the other vehicle.

The assistance system according to the present invention is further configured to determine a collision zone in which the collision resulting from the turning maneuver, between the ego vehicle and the other vehicle is likely to occur. For example, the assistance system determines that the collision, resulting from the turning maneuver, between the ego vehicle and the other vehicle may occur in the collision zone with a certain probability. Furthermore, the assistance system according to the present invention may determine the deceleration necessary for the other vehicle to stop at a point relative to the ego vehicle, e.g. to stop before entering the collision zone. Moreover, the assistance system according to the present invention may determine a risk of the collision, resulting from said turning maneuver, between the ego vehicle and the other vehicle on the basis of deceleration necessary for the other vehicle to stop at a point relative to the ego vehicle, and/or before the collision zone. Additionally, the assistance system is configured to support the driver of the ego vehicle based on the level of risk determined by the assistance system. In addition to this benefit, the following has been considered:

for implementation, the invention is a relatively low-cost solution which may utilize existing vehicle components and sensors such as, for example, VRDU and/or existing HMI and/or networks and/or a front radar.

the invention may be integrated with other existing acting safety features to further enhance safety.

For example, said front radar may be used to monitor the environment and detect the other vehicle. Alternatively or additionally, a vehicle-to-X-communication such as a vehicle-to-vehicle communication and/or a vehicle-to-infrastructure communication may be used to monitor the environment and/or detect the other vehicle. Moreover, another front facing sensing technology such as a camera and/or a lidar sensor and/or a fusion thereof may be used to monitor the environment and/or detect the other vehicle and/or determine the risk of the vehicle.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone may be employed not only in the respectively indicated combination but also in any other combination or taken alone without leaving the scope of the invention.

BRIEF DESCRIPTION OF THE DRAWINGS

The novel features and characteristic of the disclosure are set forth in the appended claims. The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

In the figures the same elements or elements having the same function are indicated by the same reference signs.

DETAILED DESCRIPTION

Figure 1:
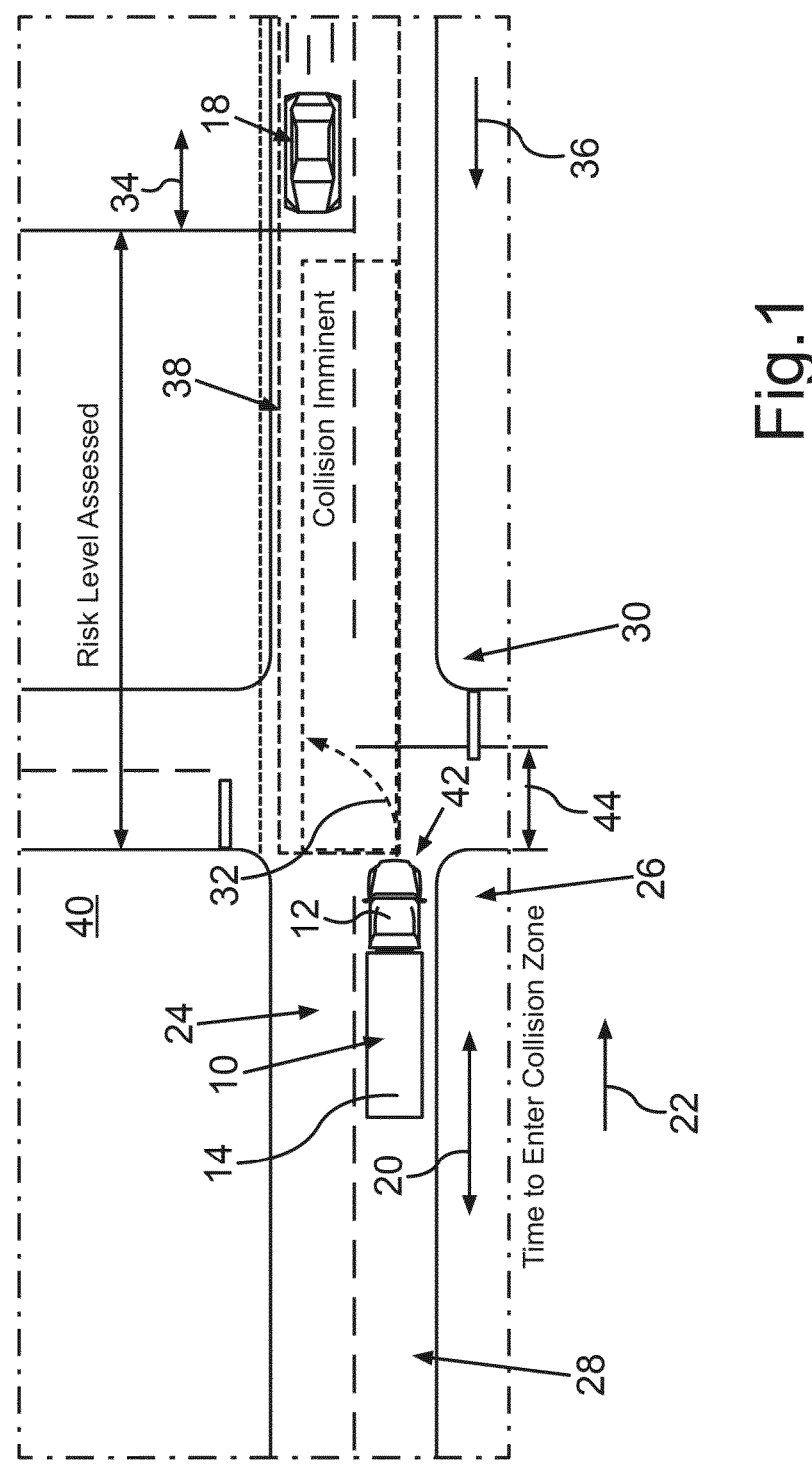
FIG. 1 shows a schematic top view of a vehicle comprising an assistance system configured to support a driver of the vehicle.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawing and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiment of the disclosure, reference is made to the accompanying drawing that forms part hereof, and in which is shown by way of illustration a specific embodiment in which the disclosure may be practiced. This embodiment is described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows, in a schematic top view, a vehicle which is referred to as an ego vehicle 10. In the embodiment shown in FIG. 1, the ego vehicle 10 is configured as a commercial vehicle. In particular, the ego vehicle 10 is a tractor-trailer combination comprising a tractor 12 and a trailer 14 which is articulatedly connected with the tractor 12. The ego vehicle 10 comprises an assistance system 16 (FIG. 2) which is also referred to as an assistance device. The assistance system 16 is configured to be installed in the ego vehicle 10. Thus, in the embodiment shown in FIG. 1, the assistance system 16 is installed in the ego vehicle 10. As will be described in further detail below, the assistance system 16 is configured to support a driver of the ego vehicle 10 in avoiding a collision of the ego vehicle 10 with another vehicle 18 approaching the ego vehicle 10. As shown in FIG. 1, the ego vehicle 10 at a first longitudinal direction illustrated by a double arrow 20. Moreover, the ego vehicle 10 has a forward direction of travel illustrated by an arrow 22. The forward direction of travel coincides or extends in parallel to the longitudinal direction of the ego vehicle 10. When the ego vehicle 10 travels forwards (i.e. when the driver of the ego vehicle 10 drives the ego vehicle 10 forwards), the ego vehicle 10 travels along its longitudinal direction and in its forward direction of travel. In the embodiment shown in FIG. 1, the ego vehicle 10 is a left-hand drive vehicle, which is exemplary. This means that, with respect to the forward direction of travel of the ego vehicle 10, a driver's side 24 of the ego vehicle 10 is arranged on a left side of the ego vehicle 10, the driver's side 24 and thus the left side of the ego vehicle 10 being opposite of a right side 26 of the ego vehicle 10. For example, at first, the driver of the ego vehicle 10 drives the ego vehicle 10 along a lane 28 in the longitudinal direction of the ego vehicle 10 and in the forward direction of travel of the ego vehicle 10. Subsequently, the ego vehicle 10 reaches an intersection 30 at which the driver of the ego vehicle 10 is about to perform a turning maneuver of the ego vehicle 10 towards the driver's side 24 of the ego vehicle 10. Said turning maneuver of the ego vehicle 10 towards the driver's side 24 of the ego vehicle 10 is also referred to as a driver side turn (DST). Said driver side turn (DST) is illustrated by an arrow 32 in FIG. 1.

As shown in FIG. 1, the other vehicle 18 has a second longitudinal direction illustrated by an arrow 34. Moreover, the other vehicle 18 has a forward direction of travel illustrated by an arrow 36. In the embodiment shown in FIG. 1, the other vehicle 18 travels along a second lane 38 along the longitudinal direction of the other vehicle 10 and the forward direction of travel of the ego vehicle 10. As illustrated by the arrows 22 and 36, the forward directions of travel are opposite to each other. If the ego vehicle 10 performed the driver side turn at least partially, the ego vehicle 10 would intersect the lane 38 and thus a driving path along which the ego vehicle 10 is most likely to travel. Thus, there might be a risk of said collision between the ego vehicle 10 and the other vehicle 18, in particular, if the driver of the ego vehicle 10 performs the driver side turn. In this regard, the assistance system 16 is configured to support the driver of the ego vehicle 10 in avoiding said collision between the ego vehicle 10 and the other vehicle 18. For this purpose, the assistance system 16 is configured to monitor an environment 40 of the ego vehicle 10. In the environment 40, for example, at least a portion of the lane 38, at least a portion of the intersection 30 and at least a portion of the other vehicle 18 are arranged such that, for example, the assistance system 16 may monitor and detect the other vehicle 18. For monitoring the environment 40, the assistance system 16 may comprise a radar, which may be configured as a front radar since, for example, said radar may be arranged at a front 42 of the ego vehicle 10.

The assistance system 16 is also configured to determine that the driver of the ego vehicle 10 is about to perform said driver side turn. The assistance system 16 is further configured to determine a collision zone 44 in which said collision, resulting from the driver side turn, between the ego vehicle 10 and the other vehicle 18 is likely to occur. For example, the assistance system 16 is configured to determine a time until the other vehicle 18 is likely to enter the collision zone 44. Furthermore, the assistance system 16 is configured to determine a deceleration necessary for the other vehicle 18 to stop relative to the ego vehicle 10 (e.g., to stop before entering the collision zone 44). The assistance system 16 determines a risk of the collision between the ego vehicle 10 and the other vehicle 18 on the basis of the deceleration determined by the assistance system 16. Furthermore, the assistance system 16 supports the driver of the ego vehicle 10 on the basis of the risk determined by the assistance system 16.

Figure 2:
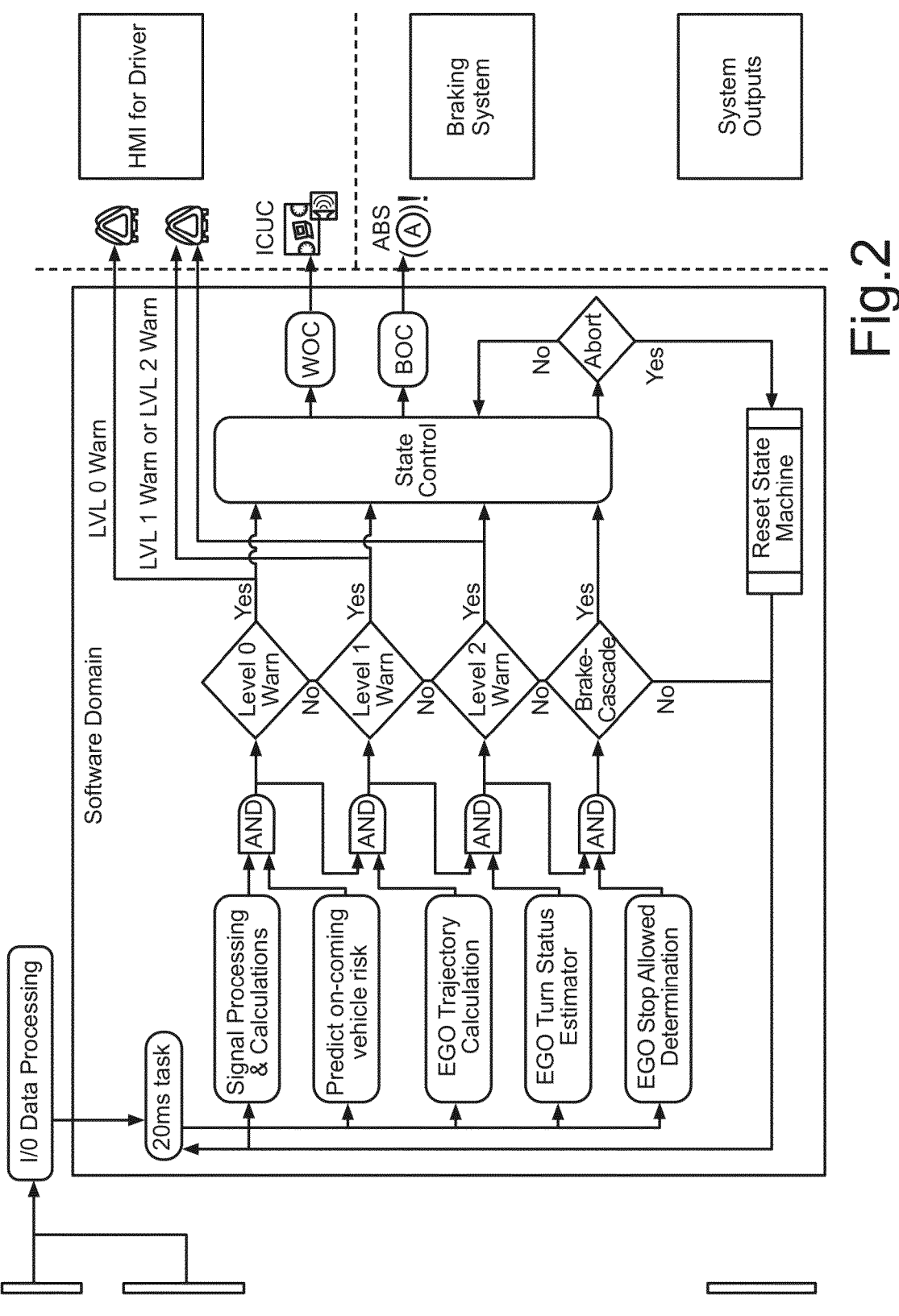
FIG. 2 shows a flow diagram for illustrating the assistance system.

Thus, as illustrated in FIGS. 1 and 2, the assistance system 16 identifies the other vehicle 18 approaching the ego vehicle 10 from the opposite longitudinal direction (double arrow 34) and assesses said risk which is also referred to as a collision risk. Preferably, the assistance system 16 warns the driver of the ego vehicle 10 only when the collision risk is high (i.e., exceeds a predetermined or predeterminable threshold value). For example, the assistance system 16 actively intervenes, in particular with braking only, when the collision is determined to be imminent and avoidable. Moreover, for example, the assistance system 16 allows the driver of the ego vehicle 10 to perform the driver side turn unimpeded and undistracted, if the risk is determined not be sufficiently high (i.e., below said threshold value and/or below a further threshold value which may be lower than the first threshold value). The assistance system 16 may allow an increased capability of the ego vehicle 10 to mitigate on-road collisions and/or fatalities. Moreover, the assistance system 16 may allow an increased capability for HMI to give the driver an awareness of approaching vehicles. For example, the assistance system 16 may be configured to optically and/or acoustically and/or haptically and/or by another method warn the driver. For example, in order to haptically warn the driver, the assistance system 16 may perform an automatic haptic braking. Moreover, for example, the assistance system 16 may be configured to automatically brake the ego vehicle 10 thereby avoiding or interrupting the driver side turn, thereby the collision between the ego vehicle 10 and the other vehicle 18 may be avoided. In an embodiment, the assistance system 16 may be configured to be integrated with a device in the interior of the vehicle which may be used to provide a warning to the driver. For example, a device such as a steering wheel or a seat may provide vibration or haptic feedback to the driver. In another example, a HMI may be used to provide a warning, such as an acoustic or optical warning. In regard to methods for warning the driver, alternative embodiments will become apparent to those of ordinary skill in the art to which the present subject matter pertains without departing from the scope hereof.

As shown in FIG. 2, the assistance system 16 may track and identify the other vehicle 18 approaching the ego vehicle 10 from the opposite longitudinal direction. The assistance system 16 may assess said collision risk based on the deceleration necessary for the other vehicle 18 to stop relative to the ego vehicle 10. If the collision risk is determined to be reasonable, the assistance system 16 may allow the driver of the ego vehicle 10 to perform the driver side turn unimpeded and undistracted. If the collision risk is determined to be high and the driver of the ego vehicle 10 indicates an intent to turn, the assistance system 16 may warn the driver of the ego vehicle 10. If and, particularly, only if the collision risk is determined to be imminent, avoidable, and a turn such as the driver side turn is in progress, the assistance system 16 may actively intervene, for example, with braking thereby avoiding or interrupting the turn. For example, the collision risk is determined to be reasonable if the deceleration is determined to be within a range of 0 to $-X$ ms$^2$, where the value of X may vary based on the state or characteristics of the ego vehicle 10 or the other vehicle 18. For example, this X value may be less than about $-3$ ms$^2$. The collision risk is determined to be high if the deceleration is determined to be within a range of $-X$ to $-Y$ ms$^2$, where the value of Y may vary based on the state or characteristics of the ego vehicle 10 or the other vehicle 18. For example, this Y value may be less than about $-6$ ms$^2$, wherein in this exemplary embodiment the collision risk is determined to be imminent (i.e., the collision is determined to be imminent), if the deceleration is determined to be lower than about $-6$ ms$^2$. It should be noted that exemplary embodiments related to the determination of collision risk are intended to be illustrative rather than restrictive. In this sense, alternate embodiments will become apparent to those of ordinary skill in the art to which the present subject matter pertains without departing from the scope hereof.

For example, the assistance system 16 determines that a driver of the ego vehicle 10 is about to perform said driver side turn based on a yaw rate of the ego vehicle 10 and/or a steering angle of the ego vehicle 10. If, for example, the yaw rate and/or the steering angle of the ego vehicle 10 are, or are greater than, the respective threshold values, it is determined that the driver of the ego vehicle 10 is either about to perform the driver side turn or has already started the turn maneuver.

Figure 3:
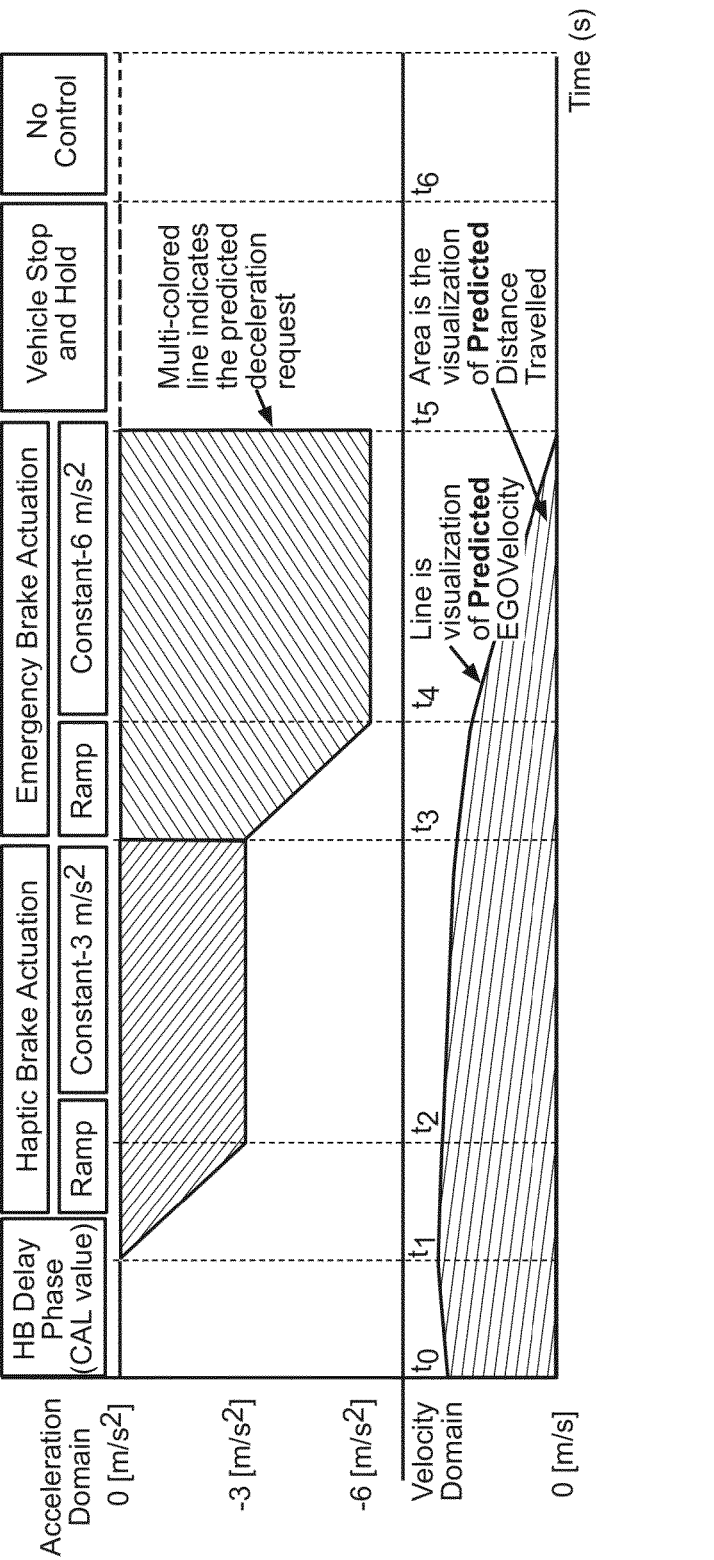
FIG. 3 shows a diagram for further illustrating the assistance system.

As shown in FIG. 3, the assistance system 16 may comprise at least or exactly three warning levels, that is warning level 0, warning level 1 and warning level 2. Warning level 0 is optical only, for example, the assistance system 16 does not consider a speed of the ego vehicle 10 or its trajectory. A turn indicator of the ego vehicle 10 and an oncoming vehicle risk level are primary factors. Moreover, for example, warning level 1 may be optical only. Warning level 1 may be for a more intense optical warning since it will consider the trajectory of the ego vehicle 10 and calculate an intersection with an incoming or oncoming object such as the other vehicle 18. Preferably, warning level 2 may give an increased intensity optical and acoustic warning to the driver just before or when an auto-braking for automatically braking the ego vehicle 10 is to be started. For example, on warning level 1, a visible indicator within the ego vehicle 10 is illuminated to a predetermined color and/or a warning indicator arranged on the dashboard of the ego vehicle 10 is illuminated. For example, on warning level 2, the visible indicator is illuminated to a predetermined color. Moreover, for example, an acoustic warning signal is provided, in particular in an interior of the ego vehicle 10, when the driver of the ego vehicle 10 is in said interior.

Preferably, the assistance system 16 automatically brakes the ego vehicle 10, in particular if the collision risk is determined to be imminent (i.e., if the collision between the ego vehicle 10 and the other vehicle 18 is determined to be imminent and avoidable). For example, for auto-braking the ego vehicle 10 by the assistance system 16, there may be a set of conditions, and, for example, said auto-braking may result in a full stop of the ego vehicle 10. There may be several special calibration parameters to enable capabilities of the auto-braking. Moreover, for example, the assistance system 16 may perform a brake-hold, in which the brake of the ego vehicle 10 is automatically held. Thus, for example, once a braking sequence brought the ego vehicle 10 to a stop, certain conditions may be fulfilled before the assistance system 16 and thus, for example, a braking system for automatically braking the ego vehicle 10 releases the brake and gives control of the brake back to the driver. For example, in order to end brake-hold, a set of conditions should be met.

For example, the collision risk is assessed on the basis of a risk model. For example, the risk model determines a deceleration rate, in particular a predicted deceleration rate, that an approaching object such as the other vehicle 18 will need, in order to stop before entering the collision zone 44. For example, the risk model assigns a risk level to each oncoming vehicle based on the afore-mentioned deceleration.

Figure 4:
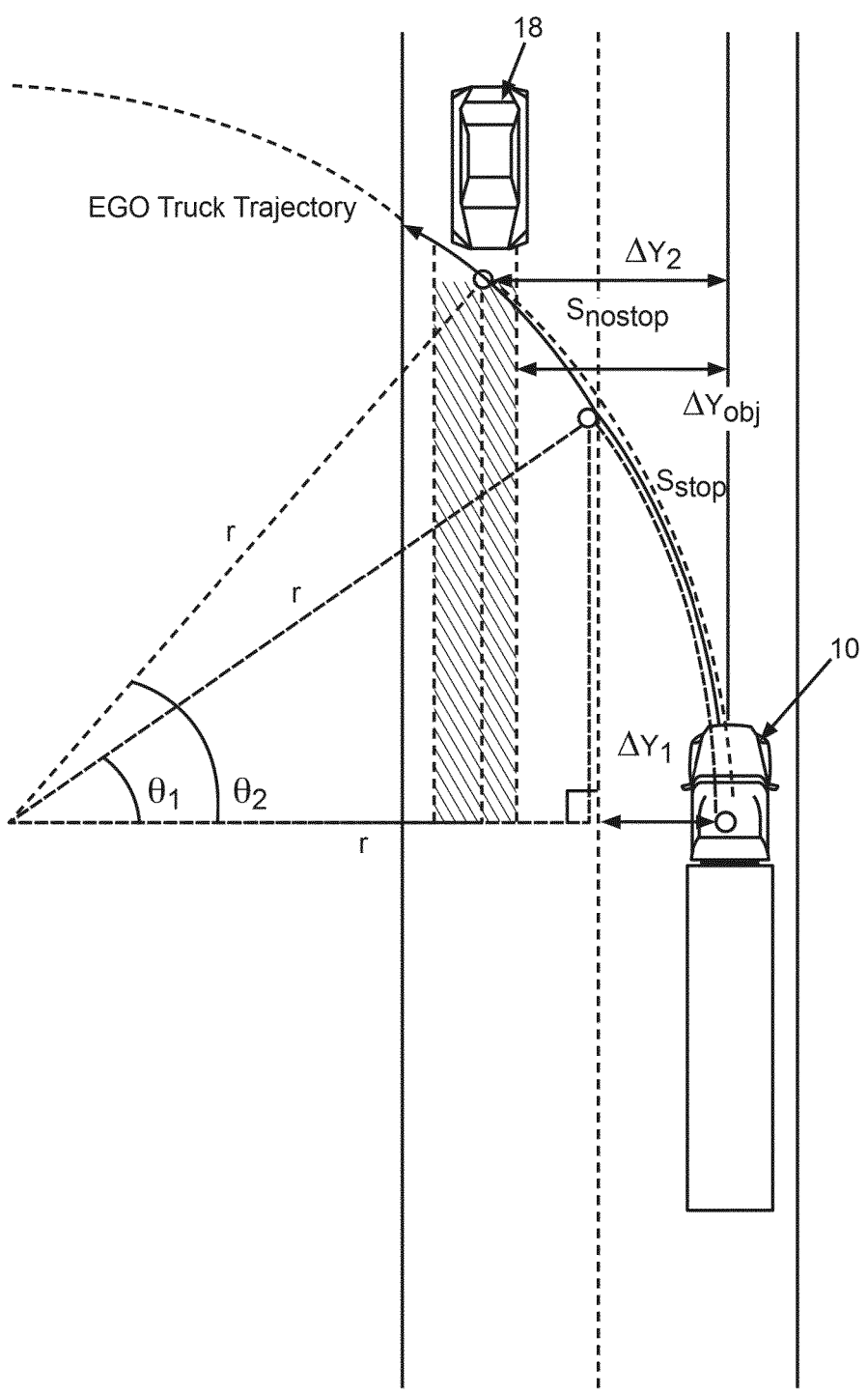
FIG. 4 shows a further schematic top view of the vehicle.
Figure 5:
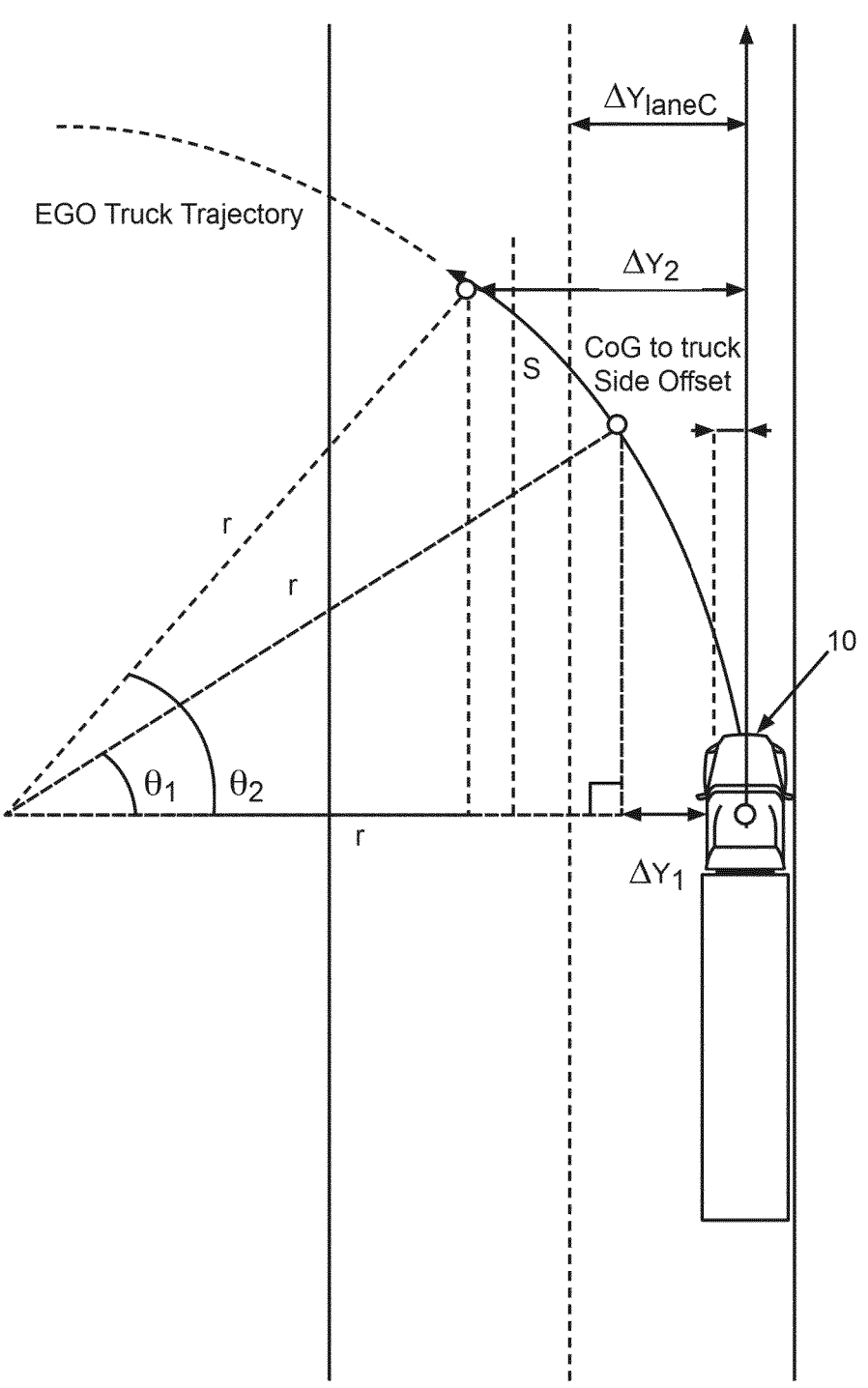
FIG. 5 shows a further schematic top view of the vehicle.

FIG. 3 shows a diagram illustrating a stopping distance estimation. FIG. 4 shows a first type of an estimator for estimating a stopping distance. Moreover, FIG. 5 shows a second type of said estimator. In FIGS. 4 and 5, r designates a turn radius of the ego vehicle 10, s designates an arc length of segment, ¢ designates an angle subtended by arc length segment, c designates a chord length of arc length segment, and y designates said yaw rate of the ego vehicle 10. Thus, for example, $s_{stopp}$ is said stopping distance of the ego vehicle 10.

REFERENCE SIGNS

10 ego vehicle
12 tractor
14 trailer
16 assistance system
18 other vehicle
20 double arrow
22 arrow
24 driver's side
26 right side
28 lane
30 intersection
32 arrow
34 double arrow
36 arrow
38 lane
40 environment

The invention claimed is:

1. A method, comprising:
determining a driver of a first vehicle is about to perform, or is in the process of, a turn maneuver into an oncoming lane, in which the first vehicle and a second vehicle are traveling in substantially opposite longitudinal directions;
determining a zone in which a collision between the first vehicle and the second vehicle in the oncoming lane is predicted to occur as a result of the turn maneuver;
predicting a deceleration rate necessary for a second vehicle to stop before entering the zone;

calculating a risk level of collision between the first vehicle and the second vehicle based on the predicted deceleration rate; and
controlling at least one vehicle operating parameter based on the risk level.

2. The method of claim 1, wherein determining the driver is about to perform, or is in the process of, the turn maneuver includes determining one or more of a yaw rate of the first vehicle, and a steering angle of the first vehicle.

3. The method of claim 2, wherein determining the driver is about to perform, or is in the process of, the turn maneuver includes determining that the yaw rate and/or the steering angle of the first vehicle is greater than respective threshold yaw rate and/or steering angle values.

4. The method of claim 1, wherein the zone is based on one or more of a determined trajectory of the first vehicle and a speed of the first vehicle.

5. The method of claim 1, wherein determining the driver of the first vehicle is about to perform, or is in the process of, a turn maneuver includes determining a status of a vehicle turn indicator associated with the first vehicle.

6. The method of claim 1, further comprising:
issuing an optical warning to the driver responsive to the risk level being calculated to be above a first threshold and below a second threshold.

7. The method of claim 1, wherein the risk level corresponds to a certain probability.

8. The method of claim 1, further comprising:
issuing an optical warning and an acoustic warning to the driver responsive to the risk level being calculated to be above a second threshold.

9. The method of claim 8, wherein the optical warning corresponding to the risk level being calculated to be above the second threshold is of a greater intensity than another optical warning corresponding to the risk level being calculated to be lower than the second threshold.

10. The method of claim 8, further comprising:
responsive to the risk level being calculated to be above the second threshold, initiating automatic braking of the first vehicle.

11. The method of claim 10, wherein initiating automatic braking of the first vehicle occurs subsequent to issuance of the optical warning and the acoustic warning to the driver responsive to the risk level being calculated to be above the second threshold.

12. The method of claim 10, wherein initiating automatic braking of the first vehicle occurs at substantially the same time as issuance of the optical warning and the acoustic warning to the driver responsive to the risk level being calculated to be above the second threshold.

13. The method of claim 10, wherein automatic braking of the first vehicle results in fully stopping the first vehicle.

14. The method of claim 10, wherein automatic braking capabilities are enabled by one or more calibration parameters.

15. The method of claim 10, further comprising initiating a brake-hold where a brake of the first vehicle is automatically held as part of the automatic braking of the first vehicle.

16. The method of claim 15, wherein one or more conditions need be met in order for the first vehicle to release the brake from the brake-hold and to give control back to the driver of the first vehicle.

17. The method of claim 1, wherein calculating the risk level relies on a risk model capable to assign a level of risk to each oncoming vehicle when conditions are met for calculating the risk level.

18. An assistance system for a first vehicle comprising: one or more technologies configured to monitor an environment of the first vehicle; and wherein the assistance system is configured to carry out the methodology of claim 1.

19. The assistance system of claim 18, wherein the one or more technologies are selected from the group consisting of a front radar, vehicle-to-vehicle communication, vehicle-to-infrastructure communication, a camera, and a LIDAR senor.

20. A vehicle comprising the assistance system of claim 19.

21. The vehicle of claim 20, where the vehicle is a commercial vehicle.

* * * * *